United States Patent [19]

Dodge

[11] Patent Number: 4,619,960
[45] Date of Patent: Oct. 28, 1986

[54] STABLE BLENDS OF VINYL CHLORIDE AND ACRYLIC LATEXES

[75] Inventor: James S. Dodge, Bay Village, Ohio

[73] Assignee: The B. F. Goodrich Company, Akron, Ohio

[21] Appl. No.: 500,119

[22] Filed: Jun. 1, 1983

[51] Int. Cl.$^4$ .............................................. C08J 5/29
[52] U.S. Cl. .................................... 524/245; 524/501; 524/502; 524/515; 524/523; 524/524; 524/527
[58] Field of Search ............. 524/245, 515, 523, 524, 524/527, 501, 502

[56] References Cited

U.S. PATENT DOCUMENTS 3,194,778  7/1965  Butzler et al. ...................... 524/523
3,206,427  9/1965  Butzler et al. ...................... 524/523

FOREIGN PATENT DOCUMENTS 0622928  6/1961  Canada ................................. 524/245
0068627  1/1973  Japan ................................... 524/523
0922549  7/1961  United Kingdom ................ 524/523

Primary Examiner—Paul R. Michl
Assistant Examiner—Alex H. Walker
Attorney, Agent, or Firm—George A. Kap; Alan A. Csontos

[57] ABSTRACT

A stable blend of a vinyl halide latex and an acrylic latex is prepared by adjusting pH of the latexes to below about 6, adding a surfactant containing nitrogen having attached thereto alkyleneoxy groups to one or both of the latexes, and mixing the latexes, the surfactant is selected from cationic-nonionic surfactants, and amount thereof should be sufficient to maintain the latex blend stable for at least one month at 20° C.

12 Claims, No Drawings

STABLE BLENDS OF VINYL CHLORIDE AND ACRYLIC LATEXES

BACKGROUND OF THE INVENTION

It is well known that vinyl chloride and acrylic latexes are colloidally incompatible when blended together. For instance, mixing two such latexes on equal weight basis results in a highly viscous gel in a matter of minutes, indicating incompatibility. Normally, as little as about 10% of one latex in the other will show incompatibility of the two latexes.

Due to the numerous advantages, it is desirable to be able to blend such latexes whereby the resulting latex blend does not show a substantial increase in viscosity or a tendency to gel. If such latexes could be blended without experiencing the incompatibility problems and without significantly changing physical properties thereof, the cost of the more expensive acrylic latex could be reduced by blending it with the less expensive vinyl chloride latex. Furthermore, by replacing some of the acrylic latex with a vinyl chloride latex, improvements in flame retardancy, water resistance, and abrasion resistance of the dried film could be obtained. Ability to blend a vinyl chloride latex with an acrylic latex should also enable one to adjust other physical properties, such as lowering the film forming temperature by replacing a portion of the harder vinyl chloride latex with the softer acrylic latex.

SUMMARY OF THE INVENTION

This invention relates to blends of vinyl halide and acrylic latexes which are prepared by adjusting pH of the latexes to slightly acidic, adding to the latexes an effective amount of a cationic-nonionic surfactant containing a nitrogen atom and repeating alkyleneoxy groups, and then blending the two latexes to obtain stable blends which do not coagulate on standing for at least one month at 20° C.

DETAILED DESCRIPTION OF THE INVENTION

Stable blends of vinyl chloride and acrylic latexes are obtained by adjusting pH of each latex to the acid side, adding a sufficient amount of a cationic-nonionic surfactant, and optionally nonionic surfactant, and blending the two latexes together. The pH of the vinyl chloride latexes is normally about 10 which is adjusted to a pH of less than about 6 with a suitable organic or inorganic acid, such as hydrochloric acid. Since pH of the acrylic latexes is around 5, pH adjustment is generally not necessary. The pH of each latex should be in the range of about 4 to 5, after adjustment. If pH of vinyl chloride latex is adjusted to a value of 6 or above, stability of the latex blend is short-lived, i.e., on the order of one day or less. The pH of vinyl chloride latex can be adjusted to a value below 4, if desired.

It has been confirmed that pH adjustment must be made before blending the two latexes. Attempts to adjust pH after blending the latexes do not alleviate the incompatibility problems and the result is highly viscous or gelled blends, which, of course, is undesirable.

Almost any acid can be used to adjust pH of the latexes before blending them. In a preferred embodiment, however, a strong inorganic acid can be used to reduce pH of the vinyl chloride latex to slightly acidic level, such as a pH of 4 to 5. Hydrochloric acid and phosphoric acid have been used for this purpose with admirable results.

Amount of the cationic-nonionic surfactant that is added to one or both latexes should be sufficient to yield a latex blend that remains stable for at least one month at room temperature of about 20° C. In the context herein, a stable latex is one that does not gel in a given period of time. Although the surfactant can be added to one or the other or to both latexes before blending the latexes, it is preferred to add all of the surfactant to the vinyl chloride latex with mixing to disperse the surfactant in the latex.

For applications such as coating and as binder for non-woven fabrics where the latex is applied by spraying, it appears that an acceptable latex blend is one which has a viscosity of less than 100 cps at 25° C., preferably less than 50 cps. When viscosity of the latex blend exceeds about 2000 cps, it becomes too thick to work with. Viscosity of the latex blends can be higher in applications where such a condition is acceptable.

Based on empirical data, it appears that amount of the cationic-nonionic surfactant to be added can vary from 0.5 to 10 weight parts, preferably 1 to 5 parts per 100 parts of solids by weight of the two latexes. It is preferred to blend latexes containing about 50% solids or less.

Suitable cationic-nonionic surfactants for the purposes herein are amine derivatives which contain a nitrogen atom in their structure as well as repeating alkyleneoxy groups. In a preferred embodiment, suitable surfactants are quaternized alkyl amine ethoxylates and tertiary amines having one fatty alkyl group derived from a fatty source containing 12 to 18 carbon atoms, and two or three alkyleneoxy groups, preferably ethyleneoxy groups, attached to the nitrogen atom, each containing at least 2 and up to about 50 repeating alkyleneoxy groups. Each alkyleneoxy group contains 2 to 5, preferably 2 to 3 carbon atoms. These latter surfactants, which are amine polyglycol condensates or alkyl amine ethoxylates, can be represented by formulas I and II as follows:

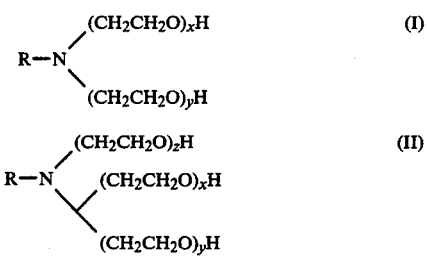

In the above formulas, R is an alkyl radical that can contain 12 to 18 carbon atoms and the sum of x, y and z can vary from 2 to 100, preferably 10 to 50. Average molecular weight of the preferred surfactants is in the range of about 200 to 3000. These preferred surfactants can also be characterized as poly(oxyethylene)alkylamines containing 10 to 50 oxyethylene units wherein the alkyl group contains 12 to 18 carbon atoms.

Specific examples of suitable surfactants include Lipoquat C-25, a quaternized alkylamine ethoxylate; Ethomeen ® C/20 having molecular weight of 645, formula of type I where sum of x and y is 10, and the source of the alkyl radical R being coco amine; Ethomeen C/25 having average molecular weight of 860, formula I type where the sum of x and y is 15, and coco amine being the source of the alkyl radical R; Ethomeen S/20 having average molecular weight of 710, formula I type where the sum of x and y is 10, and soybean amine being the source for the alkyl radical R; Ethomeen S/25 having average molecular weight of 930, formula I type with the sum of x and y is 15, with soybean amine being the source for the alkyl radical R; Ethomeen 18/20 having average molecular weight of 710, formula I type with the sum of x and y being 10, and stearyl amine being the source of the alkyl radical R; Ethomeen 18/60 having average molecular weight of 2470, formula I type with the sum of x and y being 50, and stearyl amine being the source for the alkyl radical R; Ethoduomeen ® T/20 having average molecular weight of 860, formula II type with the sum of x, y, and z being 10, and tallow amine being the source for the alkyl radical R; Ethoduomeen T/25 having the structure depicted by formula II where the sum of x, y, and z is 15; and Triton ® CF-32 is an amine polyglycol condensate.

A number of other surfactant types were tried alone without success. These surfactants are generally defined as alkylphenoxy poly(alkyleneoxy)alkanols which are of nonionic character, and thereby devoid of nitrogen. Specific examples of these surfactants are Triton X-100, Triton X-155, Igepal ® CO-880, and Igepal CO-520. Triton X-100 is octylphenoxy polyethoxy ethanol, Triton X-155 is a nonionic surfactant that is believed to be diisoamyl phenol with 10 moles of ethylene oxide, and Igepal CO-880 and CO-520 are both nonylphenoxy poly(ethyleneoxy)ethanol of different HLB value.

Although the use of the above nonionic surfactants alone did not result in stable latex blends, it has been discovered that they provide synergistic results when used in conjunction with the alkyl amine ethoxylate surfactants, i.e., the cationic-nonionic surfactants. For instance, the use of up to 2 weight parts of an alkyl amine ethoxylate surfactant per 100 weight parts of a 1:1 blend of vinyl chloride and acrylic latexes did not produce a stable blend, however, when 2 weight parts of an alkylphenoxy poly(alkyleneoxy)alkanol nonionic surfactant was combined with only 0.5 weight part of an alkyl amine ethoxylate cationic-nonionic surfactant using the same latexes, a stable latex blend was obtained. Amount of the nonionic surfactant that can be used in conjunction with the cationic-nonionic can be in the range of 0.1 to 10, preferably 0.5 to 5 weight parts per 100 weight parts of the latexes.

The ratio of vinyl chloride latex to acrylic latex can vary widely and it is intended herein to cover only those ratios that result in unstable latex blends in absence of pH adjustment and surfactant addition. Although it has already been noted that as little as about 10% of one latex in the other will result in unstable blends, it appears that even smaller amounts might cause instability in some cases. It is, therefore, intended to cover weight ratios of from 5:95 to 95:5, preferably from 10:90 to 90:10, of vinyl chloride latex solids to acrylic latex solids. It has been found to be practical to adjust the latexes to a solids content of about 50% and then to blend the latexes on a 1:1 weight basis.

The vinyl halide latexes, referred to herein, include homopolymers of vinyl chloride and vinylidene chloride and latexes wherein vinyl chloride and/or vinylidene chloride are polymerized with other monomers. Amount of polyvinyl chloride and/or polyvinylidene chloride in such latexes can vary from 5% and up to 100%, preferably a minimum of 20%. Copolymer latexes are made from vinyl and/or vinylidene halides, such as vinyl chloride and vinylidene chloride, copolymerized with one or more of suitable comonomers. Such vinyl halide latexes contain a preponderance of a vinyl halide, such as vinyl chloride, preferably greater than about 70% by weight of vinyl chloride. Examples of such comonomers are $\alpha,\beta$-olefinically unsaturated carboxylic acids containing 3 to 5 carbon atoms, such as acrylic, methacrylic, ethacrylic and cyanoacrylic acids; monounsaturated dicarboxylic acids containing 4 to 10 carbon atoms, such as fumaric and maleic acids; esters of $\alpha,\beta$-olefinically unsaturated carboxylic acids containing 4 to 12 carbon atoms and monounsaturated dicarboxylic acids containing 4 to 20 but preferably 4 to 12 carbon atoms, such as methyl acrylate, ethyl acrylate, butyl acrylate, 2-ethylhexyl acrylate, octyl acrylate, ethyleneglycol dimethacrylate, diethylene glycol diacrylate, cyanoethyl acrylate, methyl methacrylate, butyl methacrylate, hydroxypropyl methacrylate, ethyl maleate, butyl fumarate, maleic dimethyl ester, maleic acid mono-(2-ethylhexyl) ester, fumaric acid diethyl ester, and fumaric acid dilauryl ester; $\alpha,\beta$-olefinically unsaturated nitriles containing 3 to 5 carbon atoms, such as acrylonitrile and methacrylonitrile; acrylamides derived from acrylic and methacrylic acids and their N-alkylol and N-alkoxyalkyl derivatives containing 3 to 20 but preferably 3 to 12 carbon atoms, such as acrylamide itself, N-methylol acrylamide, N-butoxy methacrylamide, methylenebisacrylamide, methacrylamide, N-octyl acrylamide, diacetone acrylamide, and hydroxymethyl diacetone acrylamide; vinyl ethers containing 4 to 22 carbon atoms, such as ethyl vinyl ether, chloroethyl vinyl ether, isobutyl vinyl ether, cetyl vinyl ether, and lauryl vinyl ether; vinyl ketones containing 3 to 12 carbon atoms, such as methyl vinyl ketone; vinyl esters of carboxylic acids containing 4 to 22 carbon atoms, such as vinyl acetate, vinyl propionate, vinyl formate, vinyl stearate, vinyl benzoate, and vinyl and allyl chloroacetate; $\alpha$-olefins containing 2 to 12 carbon atoms, such as ethylene, propylene, isobutylene, and butene-1; styrene and styrene derivatives such as $\alpha$-methyl styrene, vinyl toluene, and chlorostyrene; and other polyfunctional monomers such as vinyl naphthalene, vinyl pyridine, divinyl benzene, and allyl pentaerythritol.

The term "latexes containing polyvinyl chloride and/or polyvinylidene chloride" includes latexes of vinyl chloride and vinylidene chloride homopolymers and copolymers thereof with copolymerizable monomers.

Preferred latexes are prepared by emulsion polymerization of vinyl chloride and one or more comonomers. Comonomers for the preferred latexes include acrylic and methacrylic acids and alkyl esters derived therefrom which contain 1 to 20 carbon atoms, preferably 2 to 12, in the alkyl group; amides derived from $\alpha,\beta$-olefinically unsaturated carboxylic acids and their N-alkylol and N-alkoxyalkyl derivatives such as acrylamide, N-octyl acrylamide, and hydroxymethyl diacetone acrylamide; and vinylidene halides, such as vinylidene chloride.

Specific examples of preferred vinyl halide latexes are latexes that contain a major proportion of polyvinylchloride. These latexes are copolymers of the following monomers: vinyl chloride, 2-ethylhexyl acrylate, vinylidene chloride, and acrylic acid; vinyl chloride, 2-ethylhexyl acrylate, vinylidene chloride, and hydroxymethyl diacetone acrylamide; vinyl chloride and methyl acrylate; vinyl chloride and ethyl acrylate; vinyl chloride, butyl acrylate, acrylic acid, and N-methylol acrylamide;

and vinyl chloride, 2-ethylhexyl acrylate, vinylidene chloride, and hydroxypropyl methacrylate. The latexes can be plasticized or unplasticized.

The polymer latexes embodied herein are prepared employing conventional polymerization techniques preferably in an aqueous medium with a suitable polymerization catalyst. Overpolymerization of the monomers can also be employed. Aqueous dispersions of solution polymers may be used.

The aqueous medium may be emulsifier-free or it may contain an emulsifier. When emulsifiers are used to prepare the latices of this invention, the usual types of anionic and nonionic emulsifiers will be employed. Useful anionic emulsifiers include alkali metal or ammonium salts of the sulfates of alcohols having from 8 to 18 carbon atoms such as sodium lauryl sulfate; ethanolamine lauryl sulfate, ethylamine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium-N-octadecyl sulfosuccinamate; alkali metal or ammonium salts of the free acid of complex organic mono- and diphosphate esters; and the like. Nonionic emulsifiers such as octyl- or nonylphenyl polyethoxyethanol may also be used. Latices having excellent stability are obtained with the alkali metal and ammonium salts of aromatic sulfonic acids, aralkyl sulfonates, long chain alkyl sulfonates and poly(oxyalkylene)sulfonates.

If an emulsifier is used, amount thereof can range up to about 6% or more by weight based on the monomers, but it preferably is less than 6%, and excellent results have been obtained with less than 1%. The emulsifier may be entirely added at the outset of the polymerization or it may be added incrementally or by proportioning throughout the run. Typically, a substantial amount of the emulsifier is added at the outset of the polymerization and the remainder charged incrementally or proportionately to the reactor as the monomers are proportioned.

The polymerization of the vinyl latex monomers may be conducted at temperatures from about 0° C. or less to about 100° C. in the presence of a compound capable of initiating the polymerizations. Commonly used free radical initiators include the various peroxygen compounds such as a persulfate, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds such as sodium sulfite or sodium bisulfide, a reducing sugar, dimethylamino propionitrile, a diazomercapto compound and a water-soluble ferricyanide compound, or the like. Heavy metal ions may also be used to activate the persulfate catalyzed polymerization. Polymer latices having excellent stability are obtained with alkali metal and ammonium persulfate polymerizations. The amount of initiator used will generally be in the range between about 0.1% to 3% by weight based on the total monomers and preferably is between about 0.15% and 1% by weight. The initiator may be charged completely at the outset of the polymerization, however, incremental addition or proportioning of the initiator throughout the polymerization may also be employed and is often advantageous.

Typical polymerizations for the preparation of the low-temperature curable polymer latices are conducted by charging the reactor with the appropriate amount of water and electrolyte, if any is to be employed, a portion of the emulsifier, if any, and a portion of the initiator sufficient to initiate the polymerization. The reactor is then evacuated, heated to the initiation temperature and charged with a portion of the monomer premix which is previously prepared by mixing water, emulsifier, the monomers and polymerization modifiers, if any are employed. After the initial monomer charge has been allowed to react for a period of time, the proportioning of the remaining monomer premix is begun, the rate of proportioning being varied depending on the polymerization temperature, the particular initiator employed and the amount of vinyl halide monomer being polymerized. After all the monomer premix has been charged, the final addition of initiator is made to the reactor and the latex heated with agitation for a length of time necessary to achieve the desired conversion.

Excellent results have generally been obtained with those latices containing less than 2% of emulsifiers, soaps, suspending agents or dispersants. Acceptable emulsifier-free latices have been prepared with substantially water-soluble monomers, such as ethyl acrylate and acrylic acid, often with small amounts of acrylonitrile and acrylamide that do not require any emulsifier.

In the vinyl latex, the particle size may be in the range of about 1000A. A generally satisfactory particle size may be, however, from about 500 to about 5000A. The total solids of the latices may be varied widely and may relate to the fluidity wanted in the composition. Generally, total solids of a latex is 50 to 60%.

A suitable vinyl halide latex that can be prepared as described herein, has the following formulation, in parts by weight:

| | |
|---|---|
| demineralized water | 72 |
| vinyl chloride | 75 |
| ethyl acrylate | 25 |
| ammonium persulfate | 0.5 |
| ammonium carbonate | 0.1 |
| sodium alpha olefin sulfonate | 1 |
| ammonia | 0.5 |

The latexes containing polymerized vinyl halide and/or vinylidene halide may be compounded with, or have mixed therein, other known ingredients, such as fillers, plasticizers, antioxidants or stabilizers, antifoaming agents, dying adjuvants, pigments, or other compounding aids. Furthermore, thickeners or bodying agents may be added to the polymer latices so as to control the viscosity of the latexes and thereby achieve the proper flow properties for the particular application desired.

The acrylic latexes are prepared by polymerizing one or more alkyl acrylates and/or methacrylates containing 1 to 18, preferably 1 to 8 carbon atoms in the alkyl group. One or more other copolymerizable monomers can also be included selected from vinyl and vinylidene halides, carboxylic acids selected from $\alpha,\beta$-olefinically unsaturated carboxylic acids containing 3 to 5 carbon atoms and esters thereof containing 4 to 20 carbon atoms, monounsaturated dicarboxylic acids containing 4 to 8 carbon atoms, nitriles selected from $\alpha,\beta$-olefinically unsaturated nitriles containing 3 to 5 carbon atoms, acrylamides derived from acrylic and methacrylic acids and their N-alkylol and N-alkoxyalkyl derivatives containing 3 to 12 carbon atoms, polymerizable ethylenically unsaturated monocarboxylic and dicarboxylic acids containing 3 to 8 carbon atoms and esters thereof containing 4 to 20 carbon atoms, vinyl ethers containing 4 to 22 carbon atoms, vinyl ketones containing 3 to 12 carbon atoms, vinyl esters of carboxylic acids containing 4 to 22 carbon atoms, $\alpha$-olefins containing 2 to 12 carbon atoms, styrene and styrene derivatives, and other polyfunctional monomers.

The more common comonomers that are polymerized with one or more of $C_1$ to $C_{18}$ alkyl acrylates and/or methacrylates include styrene, acrylonitrile, acrylic acid, acrylamide, methacrylamide, N-methylol acrylamide, N-methylol methacrylamide, and vinyl chloride.

In a preferred embodiment, the acrylic latexes referred to herein are prepared by emulsion polymerization of 50 to 95% by weight, preferably in excess of about 60% by weight, of one or more $C_1$ to $C_8$ alkyl acrylates or methacrylates and one or more other copolymerizable monomers noted above. In a more preferred embodiment, such comonomers are selected from $\alpha,\beta$-olefinically unsaturated carboxylic acids containing 3 to 5 carbon atoms, $\alpha,\beta$-olefinically unsaturated nitriles containing 3 to 5 carbon atoms, acrylamides derived from acrylic and methacrylic acids and their N-alkylol and N-alkoxyalkyl derivatives containing 3 to 12 carbon atoms.

More specifically, comonomers that can be used in the preparation of the acrylic latexes include acrylic acid and methacrylic acid which can be present in an amount of up to 5% by weight but preferably 0.5 to 2%, acrylonitrile can vary up to about 20% by weight but preferably up to 15%, acrylamide and N-methylol acrylamide which can be present up to about 10% by weight but preferably up to about 5%, and styrene which can be present up to about 70% preferably up to 60%.

In the preparation of the acrylic latexes described herein, the aqueous medium can contain suitable emulsifiers or it can be emulsifier-free. When emulsifiers are used to prepare the latexes of this invention, the usual types of anionic and nonionic emulsifiers can be employed. Suitable anionic emulsifiers include alkali metal or ammonium salts of the sulfates of alcohols containing 8 to 18 carbon atoms such as sodium lauryl sulfate, alkali metal and ammonium salts of sulfonated petroleum and paraffin oils, sodium salts of sulfonic acids, aralkyl sulfonates, alkali metal and ammonium salts of sulfonated dicarboxylic acid esters, and the like. Nonionic emulsifiers, such as octyl or nonylphenyl polyethoxyethanol, can also be used. Latexes of excellent stability can be prepared with emulsifiers selected from alkali metal and ammonium salts of aromatic sulfonic acids, aralkyl sulfonates, long chain alkyl sulfonates, and poly(oxyalkylene)sulfonates.

Amount of emulsifiers can vary up to about 5 parts, such as 0.1 to 5 parts by weight per 100 parts by weight of the monomers, and excellent results can be obtained with 0.01 to 1 part of emulsifiers. The latexes described herein are more preferably prepared using very low to moderate levels of emulsifiers, such as 0.005 to 1 part by weight, most favored being in the range of 0.03 to 0.5 dry parts per 100 parts of monomer. The emulsifier can be added at the outset of the polymerization or it can be added incrementally throughout the run. Typically, a substantial amount of the emulsifier is added at the outset of the polymerization and the remainder is added incrementally to the reactor as the monomers are proportioned.

The polymerization of the acrylic latex monomers can be conducted at temperatures of about 20° C. to about 100° C., typically about 80° C., in the presence of a compound capable of initiating polymerization. Commonly used free radical initiators include the various peroxygen compounds such as persulfates, benzoyl peroxide, t-butyl hydroperoxide, and cumene hydroperoxide; and azo compounds such as azodiisobutyronitrile and dimethylazodiisobutyrate. Particularly useful initiators are the water-soluble peroxygen compounds such as hydrogen peroxide and the sodium, potassium and ammonium persulfates used by themselves or in an activated redox system. Typical redox systems include alkali metal persulfates in combination with a reducing substance such as polyhydroxyphenols and oxidizable sulfur compounds, a reducing sugar, dimethylaminopropionitrile, a diazomercaptan compound, and a water-soluble ferrous sulfate compound. Polymer latexes with excellent stability can be obtained using alkali metal and ammonium persulfate initiators. The amount of initiator used will generally be in the range of 0.1 to 3% by weight, based on the weight of the monomers, preferably between 0.2 to 1%. The initiator can be charged at the outset of the polymerization, however, incremental addition of the initiator throughout polymerization can also be employed and is often advantageous.

Typical polymerizations for the preparation of the acrylic latexes described herein are conducted by charging the reactor with appropriate amount of water and electrolyte, if any is employed, and a portion of the initiator sufficient to initiate polymerization. The reactor is then evacuated, heated to the initiation temperature and charged with a portion of the monomer premix which has been previously prepared by mixing water, emulsifier, the monomers and polymerization modifiers, if any are employed. After the initial monomer charge has been allowed to react for a period of time, the proportioning of the remaining monomer premix is begun, the rate of proportioning being varied depending on the polymerization temperature, the particular initiator employed and the amount of the monomer(s) being polymerized. After all the monomer premix has been charged, the final addition of initiator is made and the reactor and the latex heated with agitation for a length of time necessary to achieve the desired conversion. The pH of the latex is in the range of about 3 to 10, but generally about 5.

In the acrylic latex, the particle size may be in the range of about 1600A° to 1700A°. A generally satisfactory particle size may be, however, from about 500 to about 5000A. The total solids of the acrylic latexes can be varied up to about 70% and may relate to the fluidity wanted in the composition. Generally, it is desired to use a latex containing 45 to 55% solids.

The acrylic latexes described herein can be compounded with, or have mixed therein, other known ingredients such as emulsifiers, curing agents, fillers, plasticizers, antioxidants or stabilizers, antifoaming agents, dying adjuvants, pigments, or other compounding aids. Furthermore, thickeners or bodying agents may be added to the polymer latexes so as to control the viscosity of the latexes and thereby achieve the proper flow properties for the particular application desired.

The following examples are presented for the purpose of illustrating the invention disclosed herein in a greater detail. The examples are not to be construed as limiting the invention herein in any manner, the scope of which is defined by the appended claims.

EXAMPLE 1

This example demonstrates the use of an amine polyglycol condensate, i.e., Triton ® CF-32, as the cationic-nonionic surfactant containing a nitrogen atom and repeating alkyleneoxy groups, in making stable latex blends. The following latexes were blended, their composition being given on weight basis:

| Latex | Composition | % Total Solids | pH |
|---|---|---|---|
| VCl Latex A | 90 VCl/10EA | 59.0 | 10.5 |
| Acrylic Latex A | 92EA/5AN/2NMA/1AA | 53.9 | 5.1 |
| Acrylic Latex B | 70EA/15nBA/10AN/3AM/2NMA | 50.3 | 5.0 |
| Acrylic Latex C | 92EA/4AN/2AM/2NMA | 50.2 | 3.8 |

The vinyl chloride latex A, identified above as VCl Latex A, consisted of 90 weight parts of polymerized vinyl chloride (VCl) and 10 weight parts of ethyl acrylate (EA). The other contractions used above were "AN" for acrylonitrile, "NMA" for N-methylol acrylamide, "AA" for acrylic acid, "nBA" for n-butyl acrylate, and "AM" for acrylamide.

Total solids and pH of some of the latexes were adjusted. The pH adjustment was made with hydrochloric acid. The pH of the acrylic latex was used as received since its pH was less than 6 and pH of the vinyl chloride latex was adjusted to about 5. To each latex, 2.0 weight parts solids of Triton CF-32 cationic-nonionic surfactant was added.

The contraction phs stands for parts per 100 parts of latex solids. Viscosity of the latex blends was then measured periodically to determine latex blend stability. Data for this set of experiments is summarized in Tables I and I A below:

TABLE I

| Blend | Latex | % TS | Triton CF-32, phs | Blend Ratio | Latex | % TS | Triton CF-32, phs |
|---|---|---|---|---|---|---|---|
| 1 | VCl A | 52 | 2.0 | 1:1 | Acrylic A | 52 | 2.0 |
| 2 | VCl A | 53.9 | 2.0 | 1:1 | Acrylic A | 53.9 | 2.0 |
| 3 | VCl A | 59 | 2.0 | 1:1 | Acrylic A | 53.9 | 2.0 |
| 4 | VCl A | 59 | 2.0 | 1:1 | Acrylic B | 50.3 | 2.0 |
| 5 | VCl A | 59 | 2.0 | 1:1 | Acrylic C | 50.2 | 2.0 |

TABLE I A

| | VISCOSITY DATA | | | | | | | |
|---|---|---|---|---|---|---|---|---|
| Blend | 0 Days | | 21 Days | | 35 Days | | 49 Days | |
| 1 | 28 | 2/60 | 32 | 2/60 | 31 | 2/60 | 35 | 2/60 |
| 2 | 35 | 2/60 | 47 | 2/60 | 45 | 2/60 | 45 | 2/60 |
| 3 | 57 | 2/60 | 80 | 2/60 | 86 | 2/60 | 97 | 2/60 |
| 4 | 93 | 2/60 | 125 | 2/60 | 125 | 2/60 | 130 | 2/60 |
| 5 | 62 | 2/60 | 116 | 2/60 | 108 | 2/60 | 102 | 2/60 |

Viscosity given above is in cps units measured at 25° C. with spindle #2 at 60 rpm. The designation 2/60 represents spindle #2 rotated at 60 rpm.

As is demonstrated in Table IA, above, viscosity of Blend 1 increased from 28 cps to 31 cps in 35 days and then to 35 cps in a total of 49 days. The other blends have also shown modest increases in viscosity over the same period of time. The stability of latex blends is very surprising and unexpected in view of the fact that normally, such blends would become very viscous or would gel in a matter of several minutes.

EXAMPLE 2

This example demonstrates addition of all of the surfactants to the vinyl chloride latex and none to the acrylic latex. The pH of acrylic latexes was less than 6 and not adjusted whereas pH of the vinyl chloride latexes was adjusted to 5. The cationic-nonionic surfactant that was used was Triton CF-32, an amine polyglycol condensate, and the composition of the latexes that were blended was as follows:

| Latex | Composition | % TS |
|---|---|---|
| VCl Latex A | 90 VCl/10EA | 59.0 |
| Acrylic Latex A | 92EA/5AN/2NMA/1AA | 53.9 |
| Acrylic Latex B | 70EA/15nBA/10AN/3AM/2NMA | 50.1 |
| Acrylic Latex C | 92EA/4AN/2AM/2NMA | 50.2 |
| Acrylic Latex D | 52EA/15nBA/28AN/3AM/2NMA | 49.3 |

The data for preparing blends of vinyl chloride latexes with acrylic latexes, and viscosity data therefor, is given in Tables II and II A, below:

TABLE II

| Blend | Latex | % TS | Triton CF-32, phs | Blend Ratio | Latex | % TS |
|---|---|---|---|---|---|---|
| 1 | VCl A | 59 | 4 | 1:1 | Acrylic D | 49.3 |
| 2 | VCl A | 59 | 3 | 1:1 | Acrylic A | 53.9 |
| 3 | VCl A | 59 | 3 | 1:1 | Acrylic B | 50.1 |
| 4 | VCl A | 59 | 3 | 1:1 | Acrylic C | 50.2 |

TABLE II A

| | VISCOSITY DATA | | | | | |
|---|---|---|---|---|---|---|
| Blend | 0 Days | | 7 Days | | 35 Days | |
| 1 | 6450 | 4/60 | — | | — | |
| 2 | 59 | 2/60 | 110 | 2/60 | 372 | 2/60 |
| 3 | 82 | 2/60 | 126 | 2/60 | 151 | 2/60 |
| 4 | 61 | 2/60 | 120 | 2/60 | 122 | 2/60 |

Table II A demonstrates that all of the surfactant can be added to one latex before blending with the other latex. This table also demonstrates that, for some reason, acrylic latex D did not produce stable blends with a vinyl chloride latex although other acrylic latexes formed stable blends with the vinyl chloride latex A.

EXAMPLE 3

This example demonstrates the synergistic effect of using a cationic-nonionic surfactant containing a nitrogen atom and alkoxy groups with a nonionic surfactant devoid of nitrogen. The following latexes were used:

| Latex | Composition | % Total Solids |
|---|---|---|
| VCl Latex A | 90 VCl/10EA | 59 |
| Acrylic Latex A | 92EA/5AN/2NMA/1AA | 53.9 |

The vinyl chloride latex was adjusted to 50% total solids and to a pH of 5 with hydrochloric acid. The acrylic latex was adjusted to 50% total solids and then was blended with the vinyl chloride latex on a 1:1 solids basis. Ethomeen ® 18/60 is a cationic-non-ionic surfactant containing a nitrogen atom and identified as being polyoxyethylene (50) octadecylamine whereas Triton ® X-155 is a nonionic surfactant devoid of nitrogen and believed to be diisoamyl phenol with 10 moles of ethylene oxide. One or both of the surfactants were added to the vinyl chloride latex but in blends #4, #5 and #6, 2 phs of Triton X-155 was also added to the acrylic latex. The data for preparing the blends and viscosity data for the blends is given in Tables III and III A, below:

TABLE III

| Blend | VCL Latex | Ethomeen 18/60, phs | Triton X-155, phs | Acrylic Latex | Triton X-155, phs |
|---|---|---|---|---|---|
| 1 | A | 0.5 | — | A | — |
| 2 | A | 1.0 | — | A | — |
| 3 | A | 2.0 | — | A | — |
| 4 | A | 0.5 | 2 | A | 2 |
| 5 | A | 1.0 | 2 | A | 2 |
| 6 | A | 2.0 | 2 | A | 2 |
| 7 | A | — | 2 | A | — |
| 8 | A | — | 2 | A | 2 |

TABLE III A

VISCOSITY DATA

| Blend | 0 Days | 7 Days | 13 Days | 33 Days | 68 Days |
|---|---|---|---|---|---|
| 1 | 20,000 4/12 | gel | — | — | — |
| 2 | 1120 3/30 | gel | — | — | — |
| 3 | 53 | 14,200 4/30 | gel | — | — |
| 4 | 40 | 235 | 266 | 251 | 227 |
| 5 | 34 | 150 | 158 | 125 | 94 |
| 6 | 29 | 95 | 98 | 86 | 72 |
| 7 | 275 | gel | — | — | — |
| 8 | 45 | 930 | — | — | — |

Viscosity was measured at 25° C. using #2 spindle at 60 rpm, unless otherwise indicated.

The data in Table III A indicates that blends #1 and #2 were prepared by admixing Ethomeen 18/60 surfactant with the vinyl chloride latex which was adjusted to solids content and pH of about 50% and 5, respectively, before blending it with the acrylic latex. At a level of 0.5 phs and 1.0 phs of the Ethomeen 18/60 surfactant in blends #1 and #2, respectively, the viscosity measured on the day of blend preparation was 20,000 cps and 1,120 cps, respectively. These blends gelled when viscosity thereof was again measured at the 7-day interval. Blend #3 was similar to blends #1 and #2 but contained 2.0 phs of Ethomeen 18/60 surfactant. Although initial viscosity of blend #3 was only 53 cps, it rose to 14,200 cps in 7 days and then gelled when viscosity was again measured 13 days after blending. The positive results obtained by also adding a nonionic surfactant devoid of nitrogen, i.e., Triton X-155, are evident by examining viscosity measurements of blends #4, #5, and #6. Although the level of Ethomeen 18/60 surfactant in blend #4 was only 0.5 phs, the 2 phs of Triton X-155 surfactant added to the vinyl chloride latex as well as to the acrylic latex turned what would normally be an unstable latex blend into a stable blend which had initial viscosity of 40 cps that increased to only 227 cps after standing for 68 days. Blends #5 and #6 further corroborate the beneficial effects of a nonionic surfactant that is devoid of nitrogen when used in conjunction with a cationic-nonionic surfactant that contains nitrogen. As evident from blends #7 and #8, the use of a nonionic surfactant alone does not produce stable blends.

EXAMPLE 4

Other surfactants were tried herein in an attempt to prepare stable blends of vinyl chloride and acrylic latexes. The following latexes were used in this experiment:

| Latex | Composition | % Total Solids |
|---|---|---|
| VCl Latex A | 90 VCl/10EA | 59.0 |
| Acrylic Latex A | 92EA/5AN/2NMA/1AA | 53.9 |
| Acrylic Latex B | 70EA/15nBA/10AN/3AM/2NMA | 50.1 |
| Acrylic Latex C | 92EA/4AN/2AM/2NMA | 50.2 |

Ethomeen and Triton CF-32 are cationic-nonionic surfactants, each of which contains nitrogen and alkoxy groups. Igepal CO-520, Triton X-100, and Triton X-155 are nonionic surfactants devoid of nitrogen. Ethomeen 18/60 is polyoxyethylene (50) octadecylamine; Ethomeen 18/20 is polyoxyethylene (10) stearylamine, i.e., octadecylamine; and, Ethomeen C-20 is polyoxyethylene (10) dodecylamine. Triton X-100 is octylphenoxy poly(ethyleneoxy)ethanol with 9 to 10 ethyleneoxy units. Igepal CO-520 is nonylphenoxy poly(ethyleneoxy)ethanol and Triton X-155 is believed to be diisoamylphenol with 10 moles of ethylene oxide.

The vinyl chloride latexes were adjusted to 50% total solids and to pH 5 to 6. The acrylic latex was also adjusted to 50% solids. The surfactants were then added, as indicated below, and the latexes were blended on a 1:1 solids basis. The data for preparing latex blends and viscosity for the blends over a period of about 2 months is given in Tables IV and IV A, below:

TABLE IV

| Blend | VCl Latex | Surfactants Added to VCl Latex, phs | Acrylic Latex | Surfactants Added to Acrylic Latex |
|---|---|---|---|---|
| 1 | A | 0.5 Eth 18/60 + 0.5 I520 | A | 0.5 I520 |
| 2 | A | 0.5 Eth 18/60 + 1.0 I520 | A | 1.0 I520 |
| 3 | A | 0.5 Eth 18/60 + 2.0 I520 | A | 2.0 I520 |
| 4 | A | 0.5 Eth 18/60 + 2.0 X155 | A | 2.0 X155 |
| 5 | A | 1.0 Eth 18/60 + 2.0 X155 | A | 2.0 X155 |
| 6 | A | 2.0 Eth 18/60 + 2.0 X155 | A | 2.0 X155 |

TABLE IV-continued

| Blend | VCl Latex | Surfactants Added to VCl Latex, phs | Acrylic Latex | Surfactants Added to Acrylic Latex |
|---|---|---|---|---|
| 7 | A | 0.5 Eth 18/60 + 2.0 CF32 | A | 2.0 CF32 |
| 8 | A | 1.0 Eth 18/60 + 2.0 CF32 | A | 2.0 CF32 |
| 9 | A | 2.0 Eth 18/60 + 2.0 CF32 | A | 2.0 CF32 |
| 10 | A | 2.0 Eth 18/20 | A | — |
| 11 | A | ↓ | B | — |
| 12 | A | ↓ | C | — |
| 13 | A | 2.0 Ethomeen C-20 | A | — |
| 14 | A | ↓ | B | — |
| 15 | A | ↓ | C | — |

TABLE IV A
VISCOSITY DATA

| Blend | 0 Days | 12 Days | 35 Days | 62 Days |
|---|---|---|---|---|
| 1 | 83 | gel | — | — |
| 2 | 41 | 9200 4/60 | — | — |
| 3 | 31 | 310 | 480 2/30 | 377 |
| 4 | 33 | 223 | 310 2/30 | 173 |
| 5 | 30 | 157 | 214 2/30 | 117 |
| 6 | 29 | 93 | 100 | 85 |
| 7 | 25 | 26 | 31 | 30 |
| 8 | 30 | 27 | 31 | 30 |
| 9 | 26 | 27 | 30 | 27 |

| Blend | 0 Days | 7 Days | 28 Days | 63 Days |
|---|---|---|---|---|
| 10 | 265 | 950 3/60- | — | — |
| 11 | 57 | 93 " | 125 | 155 |
| 12 | 50 | 80 " | 100 | 122 |
| 13 | 220 | 1880 3/30 | — | — |
| 14 | 60 | 107 " | 130 " | 145 |
| 15 | 53 | 115 " | 125 " | 142 |

Viscosity was measured at 25° C. with a #2 spindle and at 60 rpm, unless otherwise noted.

The data in Table IV A indicates that certain blends apparently require more than 2 phs of a surfactant that contains nitrogen and repeating alkoxy groups.

I claim:

1. In a latex blend comprising at least one vinyl halide latex and at least one acrylic latex, which latexes are normally collodially incompatible when mixed, the improvement comprising an admixed surfactant or a mixture thereof containing a nitrogen atom having attached thereto repeating alkylenoxy groups in sufficient amount to prevent large viscosity increase of said blend and thereby improve colloidal compatibility of said latexes, said blend containing said surfactant having acidic pH, said vinyl halide latex contains at least 5% by weight of polymerized vinyl halide or vinylidene halide and selected from homopolymers thereof and copolymers thereof with one or more other copolymerizable monomers, said acrylic latex is a polymer of 50 to 95% by weight of polymerized $C_1$ to $C_{18}$ alkyl acrylate and/or methacrylate and one or more other copolymerizable monomers, said latex blend has pH of less than about 6, said surfactant is selected from cationic-nonionic surfactants, and said blend also contains 0.5 to 10 weight parts per 100 weight parts of said vinyl halide and said acrylic latexes of a cosurfactant selected from nonionic surfactants which are devoid of nitrogen.

2. Latex blend of claim 1 having pH of about 4 to 5 and being stable for at least one month at about 20° C., wherein said vinyl halide and said acrylic latexes are devoid of a pigment, wherein said acrylic latex is prepared with an anionic emulsifier, wherein said surfactant is selected from polyoxyethylene alkylamines containing 5 to 50 oxyethylene groups and alkyl group contains 12 to 18 carbon atoms, and wherein said consurfactant is selected from nonionic alkylphenoxy poly(ethyleneoxy)ethanols, and wherein said halide is a chloride.

3. Latex blend of claim 1 having pH of about 4 to 5 consisting essentially of said vinyl halide latex in uncompounded form, said acrylic latex in uncompounded form, and at least one surfactant is selected from polyoxyethylene alkylamines containing 5 to 50 oxyethylene groups wherein the alkyl group contains 12 to 18 carbon atoms, and said cosurfactant is selected from nonionic alkylphenoxy poly(ethyleneoxy)ethanols.

4. Latex blend of claim 2 wherein said vinyl halide latex is selected from homopolymers of vinyl chloride and vinylidene chloride and from polymers of vinyl chloride and/or vinylidene chloride with one or more of the $C_1$ to $C_8$ alkyl acrylates containing at least 70% by weight vinyl chloride or vinylidene chloride; and said acrylic latex is a polymer of a $C_1$ to $C_8$ alkyl acrylate in an amount exceeding about 60% by weight and one or more of said copolymerizable monomers.

5. Method of preparing an acidic stable blend of vinyl halide and acrylic latexes, which are normally incompatible, comprising adjusting pH of said latexes to less than about 6, adding a sufficient amount of a surfactant to one or both of said latexes to prevent large viscosity increases of said blend, and mixing said latexes together, said surfactant contains at least one nitrogen atom having attached thereto repeating alkyleneoxy groups, said vinyl halide latex contains at least 5% by weight of polymerized vinyl halide or vinylidene halide and is selected from vinyl halide homopolymers and polymers thereof with one or more other copolymerizable monomers, and said acrylic latex is a polymer of 50 to 95% by weight of a $C_1$ to $C_{18}$ alkyl acrylate and/or methacrylate and one or more other copolymerizable monomers.

6. Method of claim 5 wherein said other copolymerizable monomers in said vinyl halide latex are selected from $\alpha,\beta$-olefinically unsaturated carboxylic acids containing 3 to 5 carbon atoms and esters thereof containing 4 to 12 carbon atoms, monounsaturated dicarboxylic acids containing 4 to 8 carbon atoms and esters thereof containing 4 to 12 carbon atoms, $\alpha,\beta$-olefinically unsaturated nitriles containing 3 to 5 carbon atoms, acrylamides derived from acrylic and methacrylic acids and their N-alkylol and N-alkoxyalkyl derivatives containing 3 to 20 carbon atoms, vinyl ethers containing 4 to 22 carbon atoms, vinyl ketones containing 3 to 12 carbon atoms, vinyl esters of carboxylic acids containing 3 to 22 carbon atoms, $\alpha$-olefins containing 2 to 12 carbon atoms, and styrene and styrene derivatives; and wherein said other copolymerizable monomers in said acrylic latex are selected from vinyl and vinylidene halides, $\alpha,\beta$-olefinically unsaturated carboxylic acids containing 3 to 5 carbon atoms and esters thereof containing 4 to 20 carbon atoms, monounsaturated dicarboxylic acids containing 4 to 8 carbon atoms, $\alpha,\beta$-olefinically unsaturated nitriles containing 3 to 5 carbon atoms, acrylamides derived from acrylic and methacrylic acids and their N-alkylol and N-alkoxyalkyl derivatives containing 3 to 12 carbon atoms, polymerizable ethylenically unsaturated monocarboxylic and dicarboxylic acids containing 3 to 8 carbon atoms and esters thereof containing 4 to 20 carbon atoms, vinyl ethers containing 4 to 22 carbon atoms, vinyl ketones containing 3 to 12 carbon atoms, vinyl esters of carboxylic acids containing 4 to 22 carbon atoms, α-olefins containing 2 to 12 carbon atoms, styrene and styrene derivatives, and other polyfunctional monomers.

7. Method of claim 5 wherein said surfactant is selected from amine ethoxylates and quaternized alkyl amine ethoxylates, amount thereof is 0.5 to 10 weight parts per 100 weight parts solids of said vinyl halide and said acrylic latexes, said blend being stable for at least one month at 20° C.

8. Method of claim 5 wherein said vinyl halide latex contains at least 20% by weight of polymerized vinyl chloride and said vinyl halide and acrylic latexes are blended in the weight ratio varying from 90:10 to 10:90, based on latex solids.

9. Method of claim 13 wherein said surfactant is selected from cationic-nonionic surfactants, said blend also containing 0.5 to 10 weight parts per 100 weight parts solids of said vinyl halide and said acrylic latexes of a cosurfactant selected from nonionic surfactants which are devoid of nitrogen.

10. Method of claim 9 wherein pH adjustment is made with an acid to a range of about 4 to 5, said surfactant is selected from polyoxyethylene alkylamines containing 5 to 50 oxyethylene groups wherein the alkyl group contains 12 to 18 carbon atoms, said cosurfactant is selected from nonionic alkylphenoxy poly(ethyleneoxy)ethanols, and said latex is stable for at least one, month at about 20° C.

11. Method of claim 5 wherein said surfactant is selected from polyoxyethylene alkylamines containing 5 to 50 oxyethylene groups wherein the alkyl group contains 12 to 18 carbon atoms, said blend also containing 0.5 to 10 weight parts per 100 weight parts solids of said vinyl halide and said acrylic latexes of a consurfactant selected from nonionic alkylphenoxy poly(ethyleneoxy)ethanols.

12. Method of claim 10 wherein pH of said vinyl halide latex is adjusted before mixing same with said acrylic latex and wherein said vinyl halide and acrylic latexes are devoid of a pigment.

* * * * *